Figure 1:
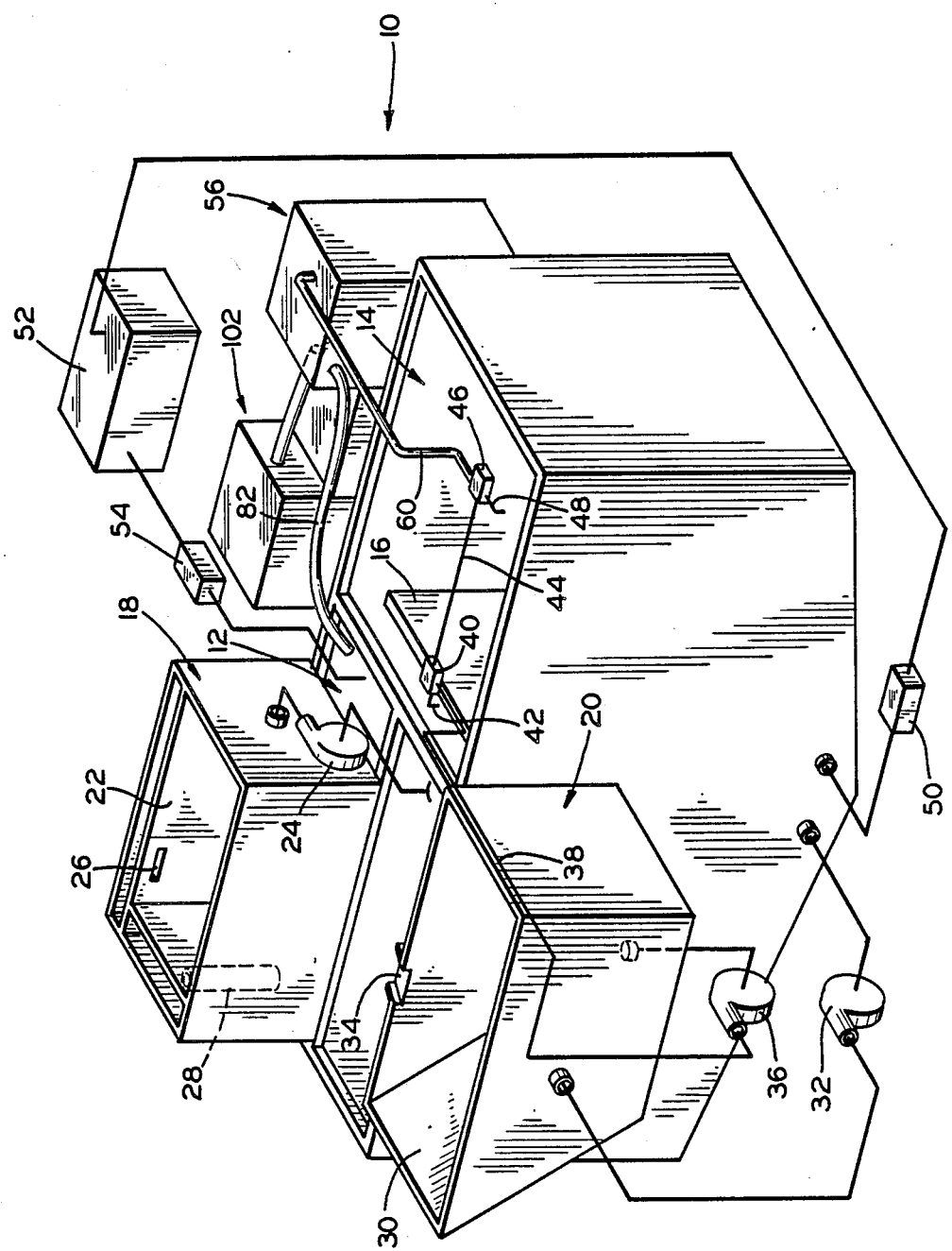

United States Patent [19]

Brandt et al.

[11] Patent Number: 4,895,649
[45] Date of Patent: Jan. 23, 1990

[54] APPARATUS FOR PROCESSING COOLANT

[75] Inventors: Robert H. Brandt, Pemberville; Merlin P. Hoodlebrink, Bradner, both of Ohio

[73] Assignee: Brandt & Associates, Inc., Pemberville, Ohio

[21] Appl. No.: 279,763

[22] Filed: Dec. 5, 1988

[51] Int. Cl.$^4$ .............................................. B01D 13/00
[52] U.S. Cl. ............................ 210/195.2; 210/257.2; 210/294
[58] Field of Search ............... 210/639, 652, 706, 804, 210/805, 806, 194, 195.1, 195.2, 252, 257.1, 257.2, 294, 321.6, 321.72, 295, 314, DIG. 5; 264/41

[56] References Cited

U.S. PATENT DOCUMENTS

| | | | |
|---|---|---|---|
| 4,053,399 | 10/1977 | Donnelly et al. | 210/706 |
| 4,160,726 | 7/1979 | Del Pico | 210/639 |
| 4,567,207 | 1/1986 | Ljubman et al. | 264/41 |
| 4,638,766 | 1/1987 | Bunch et al. | 210/652 |
| 4,770,784 | 9/1988 | Davis et al. | 210/639 |

Primary Examiner—Frank Sever
Attorney, Agent, or Firm—Allen D. Gutchess, Jr.

[57] ABSTRACT

Apparatus for processing liquid, particularly coolant used in metal-working machines, is set forth. The apparatus is adaptable for processing coolant in a wide variety of coolant systems to meet a variety of requirements of metal-working machines in a plant. The apparatus includes a coalescing unit which separates free oil from the coolant and a filtering unit which separates solid particles from the coolant. The processed coolant is then discharged back into the coolant system, along with fresh coolant. Some contaminants, including dissolved organics such as surfactants and emulsified oils remain in the coolant. Periodically, the coolant must be disposed of, being beyond its useful life in the coolant system. The coolant is then processed by an ultrafiltration unit which removes further contaminants and, if necessary, by a reverse osmosis unit which removes additional contaminants to make the remaining liquid suitable for discharge into a sewer system or the like.

9 Claims, 2 Drawing Sheets

APPARATUS FOR PROCESSING COOLANT

This invention relates to coolant-processing apparratus which is particularly adapted for use with a wide variety of coolant systems employed with metal-working machines.

Coolant systems for metal-working machines in factories vary widely. There may be from a few to many machines with which one coolant system is employed, and the individual machines may have their own reservoirs or a single large reservoir may supply several machines. The nature of contamination of the coolant in the coolant system also varies widely. With some operations, the coolant becomes highly contaminated with oil from the machines and solid particles are of little concern. In other systems, contamination by solid particles represents a substantial problem and relative little oil from the machines contaminates the coolant.

The coolant-processing apparatus in accordance with the invention is able to accomodate coolant systems employed with few or many machines and is capable of handling particular contamination problems incurred with particular metalworking systems.

The coolant-processing apparatus includes a dirty liquid or coolant tank and a clean liquid or coolant tank, preferably in side-by-side relationship. A coalescent unit is also employed and preferably is mounted above the dirty liquid tank to save floor space and to facilitate the flow of the contaminated coolant to and from the dirty liquid tank. This unit separates free oil from the coolant. The processing apparatus also includes a filtering unit preferably located beside the dirty liquid tank. This unit removes solid particles from the coolant, such particles commonly being in the nature of metal shavings from the parts being produced by the metal-working machines.

When the coolant has been processed thrpough the coalescing unit and the filtering unit for a sufficient itme to meet the needs of the particular coolant system, the coolant is supplied to the clean liquid tank. When a predetermined level is reached in the tank, the clean coolant is supplied again to the coolant sysem for the metal-working machines.

Periodically, the coolant must be disposed of even though supplemental coolant concentrate is supplied to the coolant during processing. The spent coolant contains dissolved organics i the nature of surfactants and emulsified oils and is too contaminated to be discharged into most sewer systems. Consequently, the spent coolant from the clean liquid tank is then directed through an ultrafiltration unit which removes further contaminants, rendering the coolant acceptable for many sewer systems at this time. However, the processing system can include a reverse osmosis unit which can be used to remove additional contaminants from the spent coolant to make the coolant suitable for discharge into substantially any sewer system.

The coolant-processing apparatus also includes a cleaning tank which periodically supplies cleaning liquid through the ultrafiltration unit and through the reverse osmosis unit, when used.

It is, therefore, a principal of the invention to provide coolant-processing apparatus for a wide variety of coolant systems employed with metal-working machines, which apparatus also further processes coolant for disposal.

Another object of the invention is to provide coolant-processing apparatus which includes means for processing spent coolant for disposal in accordance with the requirements of particular sewer systems.

Yet another object of the invention is to provide coolant-processing apparatus embodying units for removing oil and solid contaminants from the coolant and units for further removing dissolved organics from the coolant.

Figure 2:
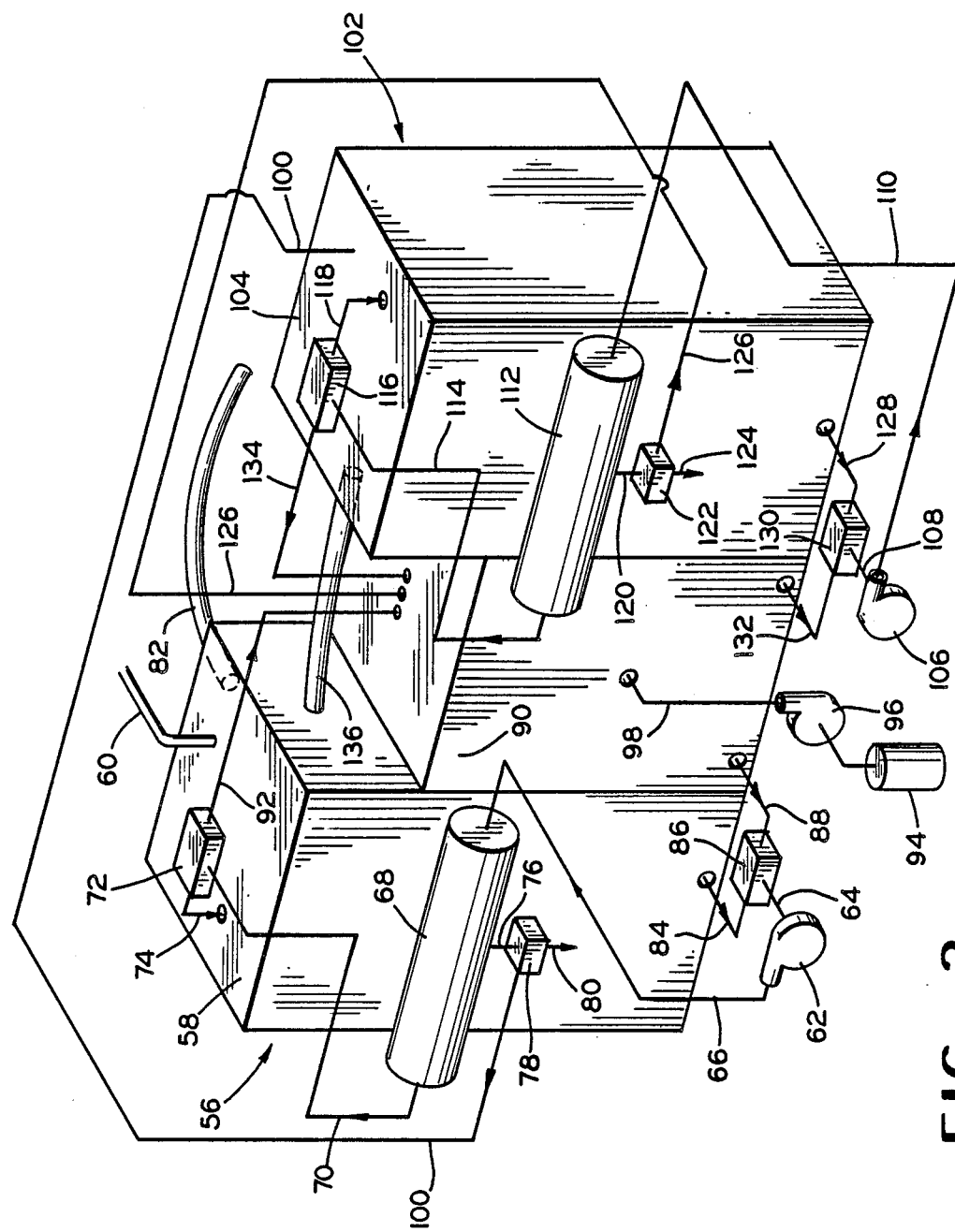

Many other objects and advantages of the invention will be apparent from the following detailed description of preferred embodiments thereof, reference being made to the accompanying drawings, in which:

FIG. 1 is a schematic overall view in perspective of coolant-processing apparatus in accordance with the invention; and FIG. 2 is a schematic view in perspective of part of the coolant-processing apparatus of FIG. 1, taken from a different angle.

Referring particularly to FIG. 1, coolant-processing apparatus in accordance with the invention is indicated at 10. The apparatus includes a dirty liquid or coolant tank 12 and a clean liquid or coolant tank 14, which preferably are in side-by-side relationship and separated by a common wall or partition 16.

A coalescing unit 18 is employed to remove free oil from the coolant, which oil is received from the metal-working machines with which the coolant system is employed. As shown, the coalescing unit 18 is mounted above the dirty coolant tank 12, which saves floor space and facilitates the flow of dirty coolant to and particularly form the unit. The coolant from the coalescing unit 18 can flow back into the dirty coolant tank by gravity.

A filtering unit 20 is mounted beside and slightly higher at its upper extremity than the dirty coolant tank 12. The filtering unit removes solid particles from the coolant, these particles usually being metal particles received from the metal-working machines. The position of the filtering unit 20 also renders the overall filtering appartus coolant-processing apparatus 10 more compact, and excess liquid in the filterin unit can flow into the dirty coolant tank 12 by gravity. Main control an auxiliary control panels (not shown) can be located adjacent the clean coolant tank 14. With this compact arrangement, the entire coolant-processing apparatus can be mounted on only two platforms to enable the apparatus to be fabricated at one location and shipped to a plant for factory where the apparatus can also be moved to different locations as needs change.

The coolant-processing apparatus as described to this point is shown and described in more detail in co-pending patent application, Ser. No. 208.089, filed June 17, 1988.

The coalescing unit 18 ahs a main tank 22 to an end of which dirty coolant is supplied from the dirty coolant tank 12 by a suitable pump 24. The tank 22 contains coalescent cells (not shown) which separate free oil from the coolant. The free oil flows through a slot 26 into a side chamber and can be periodically removed. The coolant, without free oil, can then flow back through a discharge pipe 28 to the dirty coolant tank.

The filtering unit 20 is known in the art as discussed in the aforesaid pending application and is also shown in earlier patents. It includes a filter strip (not shown) near the bottom of a tank 30 through which the coolant is drawn. Coolant from the dirty coolant tank 12 is supplied by a suitable pump 32 to an upper portion of the tank 30, with excess coolant flowing back into the dirty coolant tank 12 through a trough 34. Coolant is drawn through the filter strip by another suitable pump 36 and is supplied through a line 38 to a three-way valve 40.

The three-way valve 40 has a first branch line 42 which can supply the coolant from the pump 36 back into the dirty coolant tank 12 where it can be further processed in the coalescing unit 18 and the filtering unit 20, in either or both of these units, depending upon the operation of the pumps. After a predetermined period of time, depending upon the needs of the cooling system, the three-way valve 40 is then actuated to supply the coolant through a second branch line 44 to a second three-way valve 46. In its normal condition, the valve 46 supplies the coolant through a branch line 48 to the clean coolant tank 14. When the level of liquid in the tank 14 arises to a predetermined point, a discharge valve 50 is opened to supply the coolant system 52. As required, a fill valve 54 is opened to supply dirty coolant from the coolant system 52 back to the dirty coolant tank 12. Coolant concentrate and special additives, if desired, can be added to the coolant in the clean tank 14 prior to the coolant being sent back to the coolant system through the valve 50.

Even with the coolant concentrate and additional additives, the coolant for the system 52 eventually reaches a condition in which it can no longer be used and must be disposed of. This is primarily due to dissolved organics and minerals, comprising surfactants, emulsified oils, and water salts in the coolant, which are not removed by the coalescing unit 18 and the filtering unit 20. This spent coolant in many instances is too contaminated to be discharged into a municipal sewage system.

To render the spent coolant more suitable for disposal, an ultrafiltration unit 56, shown schematically in FIG. 2, is employed as part of the overall coolant-processing apparatus 10. The ultrafiltration unit 56 removes most of the dissolved organics, although some chemical oxygen demand contaminants and biochemical oxygen demand contaminants may remain. However, after the spent coolant is processed by the ultrafiltration unit 56 it will be acceptable for discharge into many municipal sewage systems.

The unit 56 includes a main tank 58 to which spent coolant is supplied from a branch line 60 communicating with the three-way valve 46. When the coolant is to be disposed of, the valve 46 is actuated to supply the coolant from the branche line 44 to the tank 58 instead of to the clean tank 14 through the branche line 48.

When the ultrafiltration storage tank 58 reaches a predetermined level, as determined by a suitable probe, an ultrafiltration pump 62 (FIG. 2) is actuated to supply liquid from an inlet line 64 through an outlet line 66 and to an ultrafiltration container or cartridge 68. The container 68 can be of a commercially available type and includes a tubular membrane (not shown) through which the spent coolant passes in an axial direction and is supplied back to the storage tank 58 through a line 70 a three-way valve 72, and a branch line 74. During each pass of the spent coolant through the container 68, a portion is filtered through the tublar membrane to the outside thereof and this processed coolant or permeate is discharged throug a discharge line 76 to a three-way valve 78. In many instances, this permeate is sufficiently cleaned or processed to be discharged to a sewer system. In such instance, the permeate goes to the sewer system through a discharge line 80.

When the level of spent coolant in the storage tank 58 drops to a second level, as again determined by a suitable probe, the ultrafiltration pump 62 is stopped. In a preferred operation, the pump 62 is stopped before all of the liquid in the storage tank 58 is processed so that the remaining more concentrated coolant in the tank 58 is then processed with the next supply of coolant fed through the line 60. If the total spent coolant in the tank 58 exceeds its capacity, the excess coolant is supplied through an overflow tube or line 82 back to the dirty coolant tank 12.

The coolant to the ultrafiltration container 68 normally is supplied from the lower portion of the storage tank 58 through a branch line 84 and a three-way valve 86 to the pump inlet 64 of the ultrafiltration pump 62.

Periodically, the tublar membrane in the container 68 (actually a plurality of the containers are usually employed in parallel) must be cleaned or rejuvenated. At this time, the three-way valve 86 is actuated to enable a supply line 88 to communicate with the pump inlet 64. The line 88 communicates with a cleaner storage tank 90. When the valve 86 is actuated, the three-way valve 72 is also actuated to enable the line 70 to communicate with a branch line 92 which supplies the cleaning liquid back to the tank 90. After a predetermined period of time, the valves 72 and 86 are deactivated and the pump 62 can be shut off. Cleaning liquid, which is commercially available, can be supplied from a suitable source 94 through a cleaner pump 96 to an outlet line 98 and to the cleaner tank 90.

If the permeate from the line 76 is not suitable for immediate discharge to a sewer system, the three-way valve 78 is actuated to enable the permeate line 76 to communicate with a supply line 100. This supplies the permeate to a reverse osmosis unit indicated at 102 and specifically to a storage tank 104 thereof. The reverse osmosis unit 102 removes further contaminants from the permeate from the ultrafiltration unit 56 to render the now fully processed spent coolant suitable for discharge into substantially any sewer system. However, in a rare instance, where necessary, this liquid can be even further processed through activated carbon.

When the reverse osmosis storage tank 104 is filled with the permeate to a predetermined level, a reverse osmosis pump 106 can be actuated to supply liquid from an inlet line 108 to an outlet line 110 and to a reverse osmosis container or cartridge 112 which also is commercially available. Again, a plurality of the containers 112 usually are used in parallel relationship. The liquid is again recirculated through the container 112 by the pump 106 and supplied to a line 114 to a three-way valve 116. From here the liquid is supplied to an outlet line 118 back to the tank 104 when the valve 116 is in its unactuated condition. Permeate from the container 112 is received through a line 120 to a three-way valve 122 and is discharged through a line 124. This permeate can also be used in the cleaner tank 90 in some situations through an auxiliary line 126.

When the level of the liquid in the reverse osmosis tank 104 drops to a predetermined point, the reverse osmosis pump 106 is stopped. A supply line 128 form the tank 104 is then shut off from the pump inlet line 108 by a three-way valve 130 which causes an inlet line 132 from the cleaner tank 90 to communicate with the pump inlet line 108. Cleaning liquid is then supplied by the pump 106 through the line 110 through the container 112 and through the outlet line 114 to the valve 116. The valve 116 is actuated, when the valve 130 is, to supply the cleaning liquid through a branch line 134 to the cleaner tank 90.

Preferably, the cleaning operation in the reverse osmosis unit 102, when used, takes place before the cleaning operation in the ultrafiltration unit 56 so that the cleaning liquid from the reverse osmosis cycle can be used in the ultrafiltration cycle. The cleaning liquid, after the cleaning cycle for the reverse osmosis unit, can also be used in the ultrafiltration tank 58 with the spent coolant therein to aid in the processing of the spent coolant. Preferably, the cleaning cycle for the reverse osmosis unit 102 is operated for apredetermined period of time and then the cleaning cycle for the ultrafiltration unit 56 is sequentially started, again for a predetermined period of time.

The concentrated liquid in the reverse osmosis tank 104 can also be supplied back to the ultrafiltration tank 58 by suitablemeans (not shown) for further processing with the concentrate in the tank 58. However, the remaining concentrates in both the tanks 58 and 104 must eventually be disposed of. Any excess liquid in the tank 104 can also be supplied back to the tank 58 through an overflow line 136.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. A coolant processing system comprising a clean coolant tank, a dirty coolant tank, a coalescing unit for separating free oil from the coolant, means for supplying coolant from said dirty coolant tank to said coalescing unit, means for supplying coolant from said coalescing unit to said dirty coolant tank, a filtering unit for separating particles from the coolant, means for supplying filtered coolant from said filtering unit to said dirty coolant tank and, alternately, toward said clean coolant tank, said filtered coolant supplying means comprising a pump, an inlet line connecting said filtering unit to an inlet of said pump, an outlet line connected to an outlet of said pump, a first three-way valve in said outlet line, a first branch line connected to said three-way valve for supplying liquid from said outlet line to said firty coolant tank, a second branche line communicating with said three-way valve, a second three-way valve in said second branch line, said second three-way valve having a third branch line for supplying coolant to said clean coolant tank, a fourth branch line connect4d to said second three-way valve, an ultrafitration tank communicating with said fourth branch line for receiving coolant, a first overflow line communicating with an upper portion of said ultrafiltration tank and said dirty coolant tank, for supplying excess coolant from said ultrafiltration tank to said dirty coolant tank, a reverse osmosis tank, a second overflow line communicating with an upper portion of said reverse osmosis tank and said ultrafiltration tank for supplying excess coolant from said reverse osmosis tank to said ultrafiltration tank, ultrafiltration means for filtering coolant from said ultrafiltration tank, means for circulating liquid from ultrafiltration tank to said ultrafiltration means, reverse osmosis means, means for circulating liquid from said reverse osmosis tank to said reverse osmosis means, and means for supplying coolant from said ultrafiltration means to said reverse osmosis tank.

2. A coolant processing system according to claim 1 characterized further by a cleaner tank, means for supplying cleaning liquid from said cleaner tank through said ultrafiltration means, alternately, with liquid from said ultrafiltration tank, and back to said cleaner tank, and means for supplying cleaning liquid from said cleaner tank through said reverse osmosis means, alternately, with liquid from said reverse osmosis tank, and back to said cleaner tank.

3. A coolant processing system according to claim 2 characterized further by means for supplying processed coolant from said reverse osmosis means to said cleaner tank.

4. A coolant processing system comprising a clean coolant tank, a dirty coolant tnak, a coalescing unit for separating free oil form the coolant, means for supplying coolant from said dirty coolant tank to said coalescing unit, means for supplying coolant from said coalescing unit to said dirty coolant tank, a filtering unit for separating particles from the coolant, means for supplying filtered coolant from said filtering unit to said dirty coolant tank and, alternately, toward said clean coolant tank, said filtered coolant supplying means comprising a pump, a first three-way valve in said outlet line, a first branch line connected to said three-way valve for supplying liquid from said outlet line to said dirty coolant tank, a second branche line communicating with said three-way valve, a second three-way valve in said second branch line, said second three-way valve having a third branch line for supplying coolant to said clean coolant tank, a fourth branch line connected to said second three-way valve, an ultrafiltration tank communicating with said fourth branch line for receiving coolant, a first overflow line communicating with an upper portion of said ultrafiltration tank and said dirty coolant tank, for supplying excess coolant fromsaid ultrafiltration tank to said dirty coolant tank, ultrafiltration means for filtering coolant from said ultrafiltration tank, and means for circulating liquid from ultrafiltration tank to said ultrafiltration means.

5. A coolant processing system according to claim 4 characterized by a reverse osmosis tank, a second overflow line communicating with an upper portion of said reverse osmosis tank and said ultrafiltration tank for supplying excess coolant from said reverse osmosis tank to said ultrafiltration tank.

6. A coolant processing system according to claim 5 characterized by reverse osmosis means, means for circulating liquid from said reverse osmosis tank to said reverse osmosis means.

7. A coolant processing system according to claim 6 characterized by means for supplying coolant from said ultrafiltration means to said reverse osmosis tank.

8. A coolant processing system according to claim 7 characterized further by a cleaner tank, means for supplying cleaning liquid from said cleaner tank through said ultrafiltration means, alternately, with liquid from said ultrafiltration tank, and back to said cleaner tank, and means for supplying cleaning liquid from said cleaner tank through said reverse osmosis means, alternately, with liquid from said reverse osmosis tank, and back to said cleaner tank.

9. A coolant processing system according to claim 8 characterized further by means for supplying processed coolant from said reverse osmosis means to said cleaner tank.

* * * * *